United States Patent [19]

Yoshizawa et al.

[11] Patent Number: 4,991,082
[45] Date of Patent: Feb. 5, 1991

[54] VIRTUAL STORAGE SYSTEM AND METHOD PERMITTING SETTING OF THE BOUNDARY BETWEEN A COMMON AREA AND A PRIVATE AREA AT A PAGE BOUNDARY

[75] Inventors: Yasufumi Yoshizawa, Tachikawa; Taketoshi Sakuraba; Toshiaki Arai, both of Yokohama; Toshiyuki Kinoshita, Sagamihara; Minoru Shibamiya, Yokohama; Takashige Kubo, Hachioji, all of Japan

[73] Assignee: Hitachi, Ltd., Tokyo, Japan

[21] Appl. No.: 924,028

[22] Filed: Oct. 28, 1986

[30] Foreign Application Priority Data

Oct. 28, 1985 [JP] Japan ............................ 60-239360

[51] Int. Cl.⁵ .................................. G06F 12/08
[52] U.S. Cl. ............................ 364/200; 364/232.1; 364/256.3
[58] Field of Search ... 364/900 MS File, 200 MS File

[56] References Cited

U.S. PATENT DOCUMENTS

| | | | |
|---|---|---|---|
| 3,412,382 | 11/1968 | Couleur et al. | 364/200 |
| 3,725,874 | 4/1973 | Van Heel | 364/200 |
| 3,938,096 | 2/1976 | Brown et al. | 364/200 |
| 4,084,226 | 4/1978 | Anderson et al. | 364/200 |
| 4,145,738 | 3/1979 | Inoue et al. | 364/200 |
| 4,253,145 | 2/1981 | Goldberg | 364/200 |
| 4,385,352 | 5/2483 | Bienvenu | 364/200 |
| 4,439,830 | 5/1984 | Chueh | 364/200 |
| 4,456,954 | 6/1984 | Bullions, III et al. | 364/200 |
| 4,581,702 | 4/1986 | Saroka et al. | 364/200 |

OTHER PUBLICATIONS

Harry Katzan, Jr. et al., Invitation to MVS, N.Y. Petrocelli Books, Inc., 1984, pp. 35-54.
Stuart E. Madnick, et al., Operating Systems, McGraw-Hill Book Co., 1974, pp. 42-45 and pp. 130-145.

Primary Examiner—Raulfe B. Zache
Attorney, Agent, or Firm—Antonelli, Terry, Stout & Kraus

[57] ABSTRACT

An area boundary between a system common area and a job private area is set at any page boundary independently from a segment boundary, and for the segment (boundary segment) containing the area boundary, a page table is prepared for each virtual address space. Thus, virtual pages which are not used as the system common area in the bondary segment can be used by jobs as job private areas.

The real page is fixedly allocated to the virtual page belonging to the system common area in the boundary segment. Thus, it is not necessary to simultaneously update page tables for the system common area. Those virtual pages may be subjects of dynamic allocation of the virtual storage.

18 Claims, 5 Drawing Sheets

VIRTUAL STORAGE SYSTEM AND METHOD PERMITTING SETTING OF THE BOUNDARY BETWEEN A COMMON AREA AND A PRIVATE AREA AT A A PAGE BOUNDARY

BACKGROUND OF THE INVENTION

The present invention relates to a virtual storage system for a computer, and more particularly to management of system common areas and job private areas in a plurality of virtual address spaces.

Virtual storage is provided by an address translator which translates a virtual address of a virtual address space into a real address corresponding to a physical position in a real storage device. The address translator has an address translation table which is looked up by a virtual address A read-out entry indicates a reference point of a real address corresponding to the virtual address used for look-up.

In a two-level paging system for virtual storage which has been widely used, the virtual address space is divided into areas of a constant size called segments, and each area segment is divided into areas of a constant size called pages. The real address space is also divided into pages, and the real storage is allocated to the virtual address space page by page. Typically, one page has 4K bytes and one segment has 64K bytes (16 pages). In correspondence to the division of the virtual address space, the address translation table comprises a segment table and page tables. A segment number in a virtual address specifies one entry of the segment table, and the specified entry specifies a page table for the corresponding segment. A page number in the virtual address specifies one entry of the specified page table, and the specified entry imparts an address of a real page allocated to the virtual page corresponding to the specified entry.

A plurality of virtual address spaces may be formed for one real storage device, and one virtual address space may be allocated to each job. In this case, a segment table is prepared for each virtual address space, and each segment table has its own page tables as a basic rule. In such a case, the virtual address space is divided into job private areas and system common areas The job private area is exclusively used for a job and the content thereof is independent of that for other virtual address spaces. Accordingly, allocation of real storage to this area is free. On the other hand, the system common area is for information common to a plurality of virtual address spaces (for example, an area for accommodating common data and common programs such as OS, inter-job communication and others). Accordingly, the same virtual address in the areas of the virtual address spaces must be translated into the same real address.

In the past, a boundary between the system common area and the job private area has corresponded to a segment boundary, because the segment tables of the virtual address spaces are set to specify the same page tables for the system common area. Such common use of the page table is due to the above requirement that the same virtual address in the system common area must be converted into the same real address. This requirement means that the content of the page table for the system common area must always be the same for all virtual address spaces. The common use of the page table is adopted because of the above requirement. Under such a mechanism, it is difficult to use a portion of one segment as the system common area and another portion as the job private area, because every real page corresponding to the page in the segment which includes the system common area is shared by all virtual address spaces or all jobs through the common page table. As a result, even if there is a page in the segment of the system common area at the boundary, which page is not used in the system common area, it cannot be used as the job private area, and so an idle area may be created.

Figure 2:
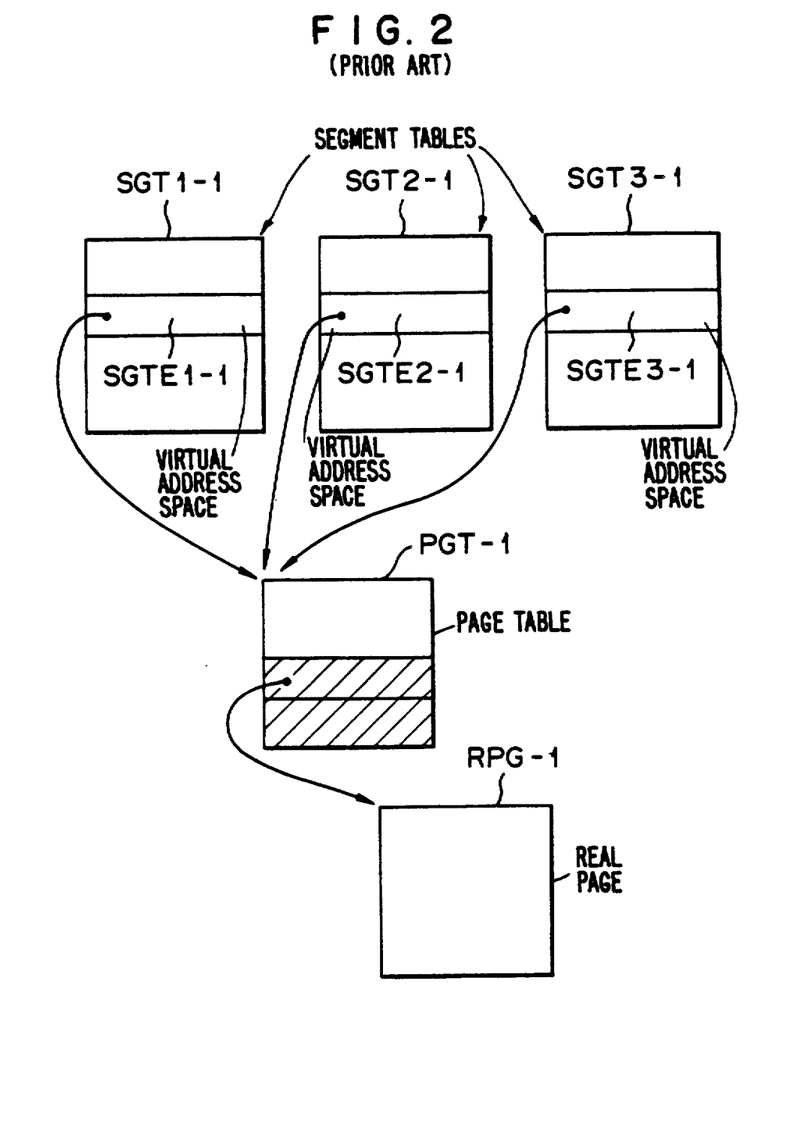
FIG. 2 shows a diagram of a prior art address translator for a segment corresponding to the boundary segment.

FIG. 2 diagramatically shows a process of address translation for the system common area by the shared page table. Let us assume that there are three virtual address spaces, and entries SGTE1-1, SGTE2-1 and SGTE3-1 of segment tables SGT1-1, SGT2-1 and SGT3-1 of the respective virtual address spaces correspond to the segment including the system common area and designate the same page table PGT-1. Each entry of the page table PGT-1 indicates whether a corresponding virtual page has been allocated and whether a real page for the virtual page is allocated, and when the real page is allocated, indicates the real page RPG-1. The status usually dynamically changes, and the content of the page table PGT-1 is updated accordingly. A hatched area in the PGT-1 shown in FIG. 2 is a portion corresponding to the page which is actually used as the system common area, and other area is a portion corresponding to the idle pages.

In the prior art virtual storage, since the segment size is relatively small, the number of idle pages is limited and no serious problem occurs. However, as the virtual address space is expanded and the segment size is increased, the number of idle pages may become very large. For example, when the segment size is 64K bytes (16 pages), the number of idle pages can be as many as 15. However, in a 2G-byte virtual address space having 2048 segments of 1M-byte (256 pages) size, the number of idle pages can reach 255 in the worst case. This is significant waste. When jobs prepared on the premise of a virtual address space of the conventional size are executed with a large virtual address space, the job private area is very much limited.

SUMMARY OF THE INVENTION

It is an object of the present invention to improve the utilization efficiency of a virtual address space by allowing free division of one segment of the virtual address space into a system common area and a job private area.

In accordance with the present invention, there is provided a virtual storage system comprising: a real storage device having a real address space divided into real pages of a fixed size; an address translator for translating virtual addresses of a plurality of virtual address spaces into real addresses; each of said virtual address spaces being divided into segments each consisting of a fixed number of virtual pages, and including a system common area and a job private area; said address translator having a plurality of page tables for associating the virtual pages of the virtual address spaces to the real pages, and segment tables provided one for each virtual address space for associating the segments of the virtual address spaces to the page tables; characterized in that an area boundary between the system common area and the job private area is set at a page boundary independently from a segment boundary, and a page table corresponding to a boundary segment containing the area boundary in the middle thereof is prepared for each virtual address space.

DESCRIPTION OF THE PREFERRED EMBODIMENTS

Figure 1:
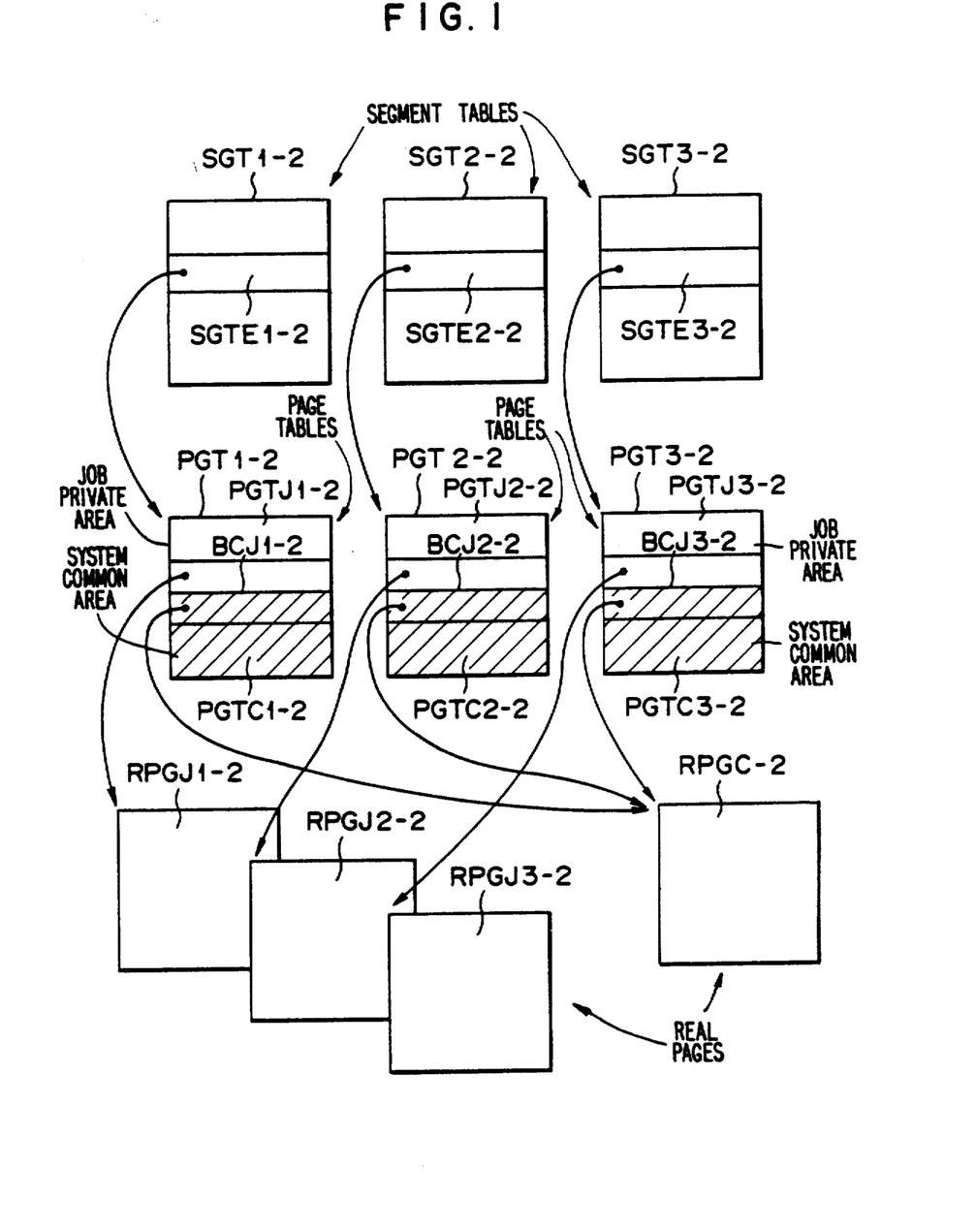
FIG. 1 shows a diagram of an address translator for a boundary segment in accordance with the present invention.

FIG. 1 shows address translation tables prepared for boundary segments in accordance with the present invention and a process of address translation by using the tables. Let us assume that there are three virtual address spaces, and separate page tables PGT1-2, PGT2-2 and PGT3-2 are prepared for entries SGTE1-2, SGTE2-2 and SGTE3-2 corresponding to boundary segments of segment tables SGT1-2, SGT2-2 and SGT3-2 for the respective virtual address spaces. In other words, each entry specifies a different one of the page tables. In those page tables, hatched areas PGTC1-2, PGTC2-2 and PGTC3-2 correspond to a system common area, and entries at the same positions of those areas specify the same real page, for example, RPGC-2. Accordingly, the contents of those page table portions are identical to each other. Other portions PGTJ1-2, PGTJ2-2 and PGTJ3-2 of the page tables may have different contents for each virtual address space and may specify different real pages, for example, RPGJ1-2, RPGJ2-2 and RPGJ3-2. Those portions can thus be used as job private areas. Boundaries between the system common area and the job private areas, BCJ1-2, BCJ2-2 and BCJ3-2 are set at any page boundaries independently from segment boundaries.

Figure 3:
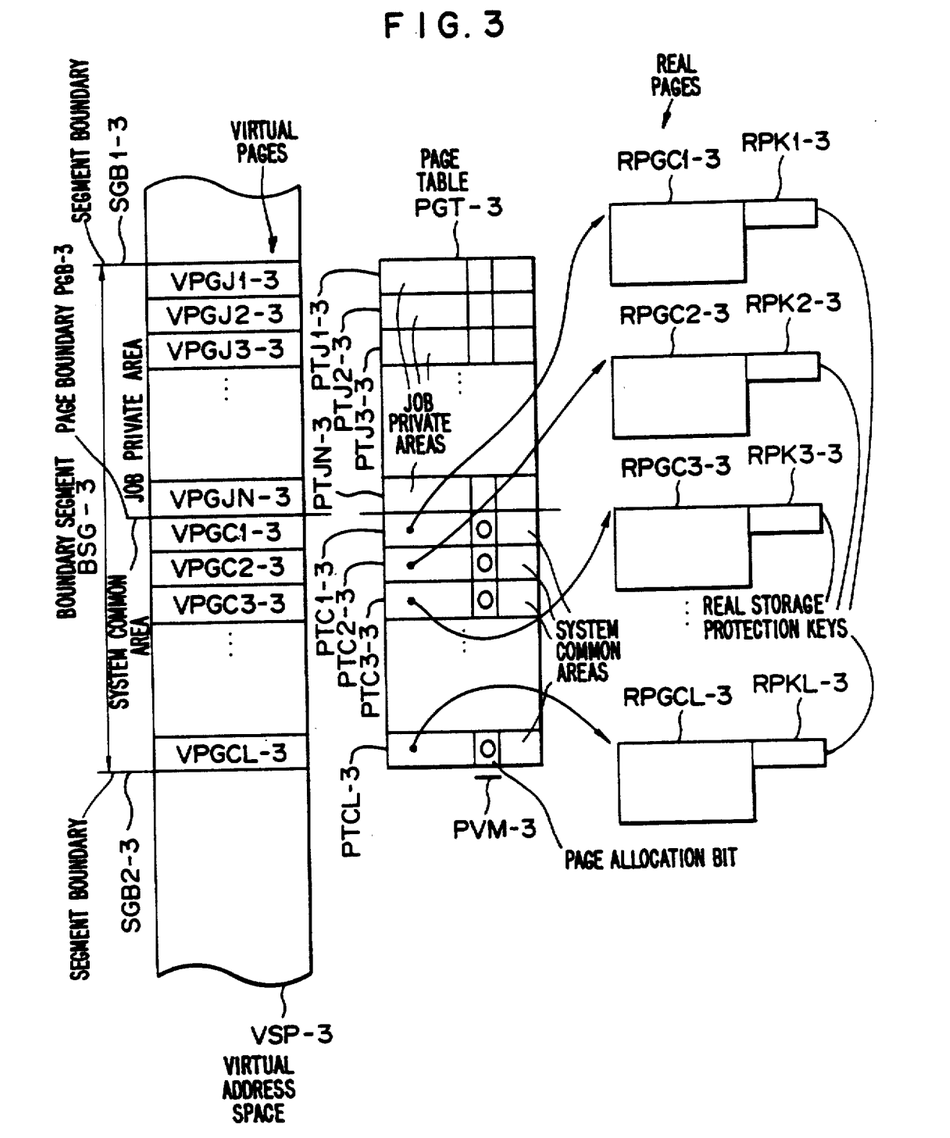
FIG. 3 shows the relationship among the boundary segment, a page table and a real page, in accordance with the present invention.

If a real page allocation to a virtual page is changed in the system common area in the boundary segment, entries corresponding to the page tables PGT1-2, PGT2-2 and PGT3-2 must be simultaneously changed. This creates an significant overhead. In order to avoid this, real pages are fixedly allocated to all virtual pages in the system common area in the boundary segment. That is, this area is excluded from the dynamic allocation of the real page, FIG. 3 shows the relationship among the boundary segment, the corresponding page table and the real page allocated to the system common area. In the page table PGT-3 for the boundary segment BSG-3 of the virtual address space VSP-3, the entries PTC1-3 to PTCL-3, corresponding to the pages VPGC1-3 to VPGCL-3 in the system common area, specify the real pages RPGC1-3 to RPGCL-3, respectively, and the real page allocation bits PVM-3 of those entries are "0" indicating the real page allocation. The pages VPGJ1-3 to VPGJN-3 of other areas may be freely used as the job private areas, and the entries PTJ1-3 to PTJN-3 corresponding thereto specify other real pages appropriately allocated or no real page allocation. The bit PVM-3 of the entry on the page to which no real page is allocated is "1". PGB-3 represents a boundary segment between the system common area and the job private area, and SGB1-3 and SGB2-3 represent segment boundaries.

The real pages RPGC1-3 to RPGCL-3 allocated to the system common area in the boundary segment have real storage protection keys RPK1-3 to RPKL-3. Those real storage protection keys are compared with keys given to programs which issued access requests to those real pages so that reading and writing by a mismatched program are prevented, and destruction or unauthorized use, either by error of the program or intentionally, of the content in the system common area is prevented.

Figure 4:
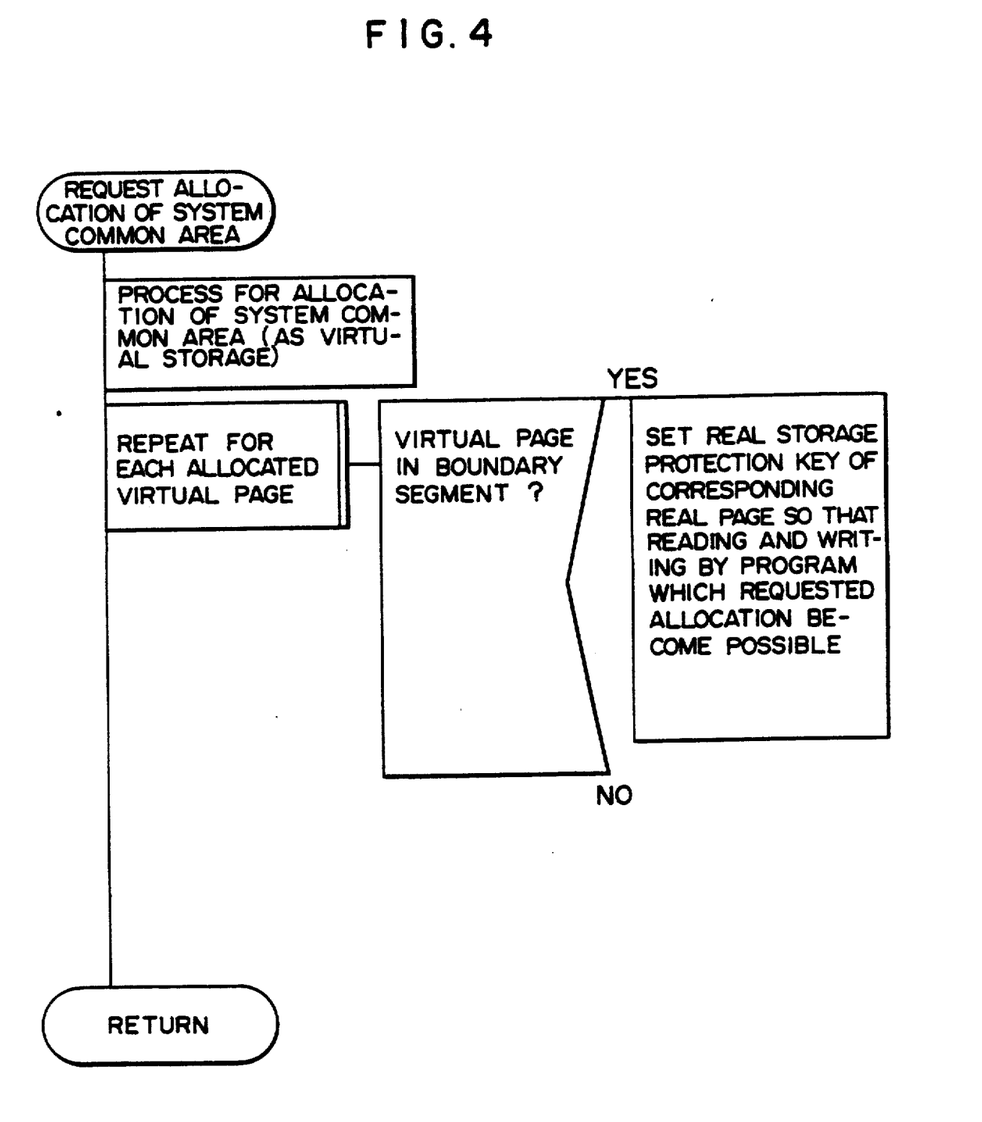
FIGS. 4 to 6 show process flow charts for one embodiment of the present invention.

In the present embodiment, the system common area in the boundary segment is fixed for the real page allocation but it is a subject of dynamic allocation and deallocation of the virtual storage to the jobs. The system common area in the boundary segment is allocated to the allocation request of the system common area, and the allocation is deallocated when the allocation is no longer necessary. To this end, when the system common area in the boundary segment is allocated to the allocation request of the system common area, the real storage protection key of the real page previously allocated to the system common area is updated to allow reading and writing by the program which has issued the allocation request. Of course, reading and writing by the program having a different key are not permitted. When it is to be deallocated the real storage protection key is again updated to prevent reading and writing by the released program. FIG. 4 shows a process flow for setting the real storage protection key for the allocation of the system common area.

Figure 5:
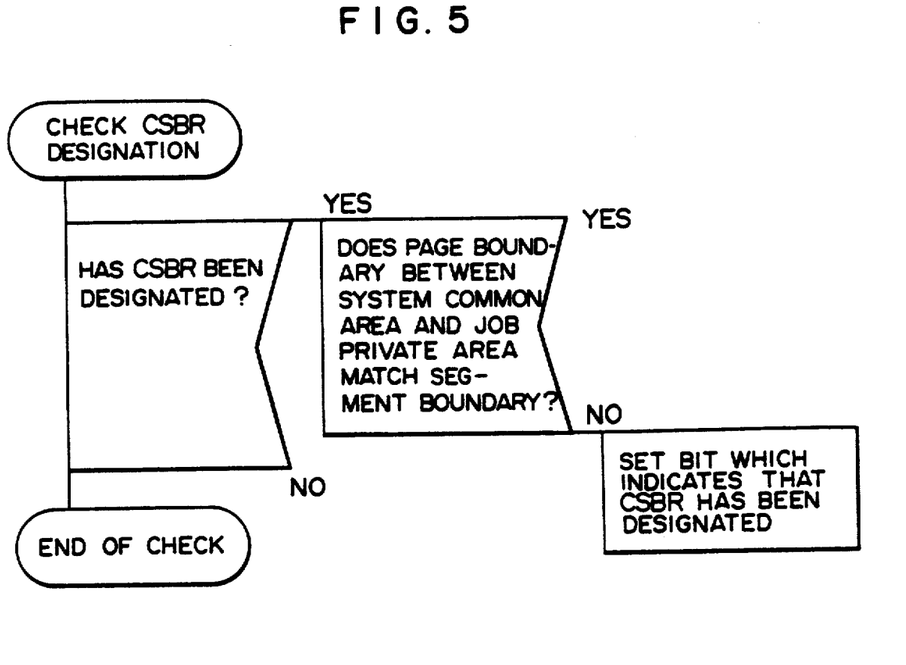
Figure 6:
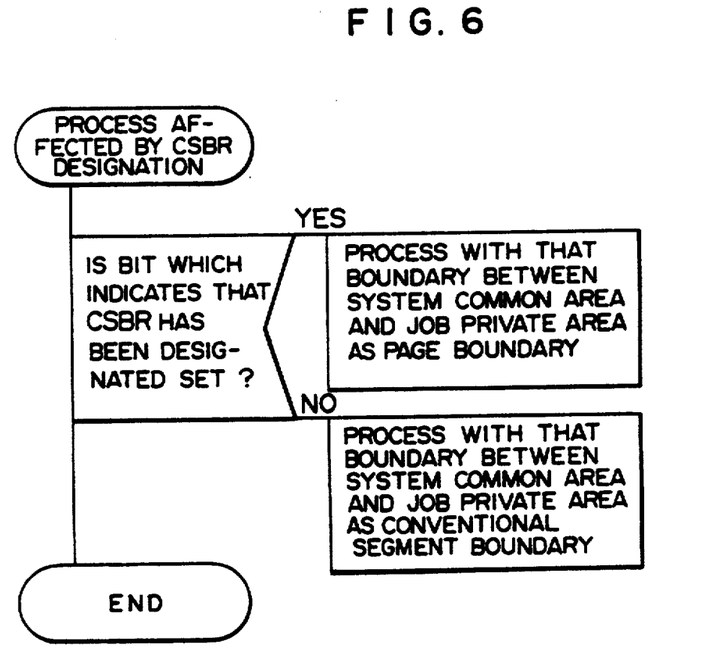

FIGS. 4 to 6 are represented in a form known as PAD (problem analysis diagram). The PAD is briefly explained here. The PAD is a type of flow chart which expresses a process flow by interconnection of three types of boxes. A simple rectangular box represents a conventional sequential process unit, a rectangular box having a recess on its right side indicates that one of the processes of boxes connected to the right upper corner and the right lower corner of the recessed box is carried out, depending on a determination condition expressed in the box, and a rectangular box having a vertical line on the right end represents repetition of a process of a box connected on the right hand. An overall process flows from the top to the bottom. In FIG. 4, the system common area is first allocated, and then for each of the allocated virtual pages, a real storage protection key is set if it is the virtual page in the boundary segment.

Whether the boundary between the system common area and the job private area is to be set at the page boundary independently from the segment boundary in accordance with the present invention, or at the segment boundary as is done in the prior art system, can be selected at the time of system generation or initial program loading (IPL). When the setting at the page boundary is selected and the page boundary as the area boundary matches coincidentally to the segment boundary, the conventional process is carried out. In order to process in accordance with the selection, the selection status is checked during the initial program loading at the start of the system, and if the setting at the page boundary has been selected, whether the page boundary as the area boundary matches the segment boundary or not is checked, and if it does not match, a real page is allocated to the system common area in the boundary segment and a bit is set in an OS control table to indicate that the setting at the page boundary has been selected. In subsequent management of the virtual storage, the process is selected by referring the above bit. The above process flow is shown in FIGS. 5 and 6. CSBR represents a mode in which the area boundary is set at the page boundary in accordance with the present invention.

In the present embodiment, since the allocation of the real page to the system common area in the boundary segment is fixed, no page fault occurs in this area, and delay of the process by paging does not occur. Accordingly, by storing frequently used programs and data such as a language processor and a filing index in this area, process efficiency can be improved.

Since the boundary segment is the subject of dynamic allocation of the virtual storage, compatibility with the conventional system is high. Further, whether the boundary between the system common area and the job private area is to be set at the segment boundary as is done in the conventional system or at the page boundary independently from the segment boundary can be selected by the parameter setting at the IPL. Accordingly, flexible operation of the system is attained.

In accordance with the present invention, the boundary between the system common area and the job private area of the virtual address space can be set at any page boundary. Accordingly, the idle pages which would have been created in the conventional system can be allocated to the jobs as the private areas, and the utilization efficiency of the virtual address space can be improved. This results in expansion of the job private area and facilitates the expansion of the existing application program. The larger the segment size is, the larger is the advantage of the present invention.

We claim:

1. A method of managing storage areas in a computer which, in response to virtual addresses designated in programs run on the computer, accesses a real storage device divided into a plurality of real pages, wherein the virtual addresses correspond to a plurality of virtual address spaces, each of said virtual address spaces being divided into a plurality of segments, each segment comprising a number of virtual pages, each virtual address space including a system common area and a private area, said computer including an address translator for translating virtual addresses into real addresses of the real storage device, said address translator having a plurality of page tables, for associating virtual pages of the virtual address spaces to real pages, and a plurality of segment tables, one segment table required for each virtual address space, for associating the segments of the virtual address space to page tables provided for the virtual address space; said method comprising the steps of:

(a) preparing for each virtual address space a boundary page table corresponding to a boundary segment having an area boundary of the system common area and the private area, the boundary page table including first locations, for holding first address transformation information common to the virtual address spaces for associating virtual pages belonging to the system common area within the boundary segment of the virtual address space to real pages commonly allocated to all virtual address spaces, and further including second locations, for holding second address transformation information for the corresponding virtual address space for associating virtual pages belonging to the private area within the boundary segment to real pages privately allocated to that virtual address space;

(b) determining real pages common to the virtual address spaces and to be fixedly allocated to predetermined virtual pages belonging to the system common area within the boundary segment of each of the virtual address spaces and being allocatable to a program on demand, before a program issues a virtual page allocation demand for the predetermined virtual pages so as to set appropriate address transformation information, required for allocation of the determined real pages to the predetermined virtual pages, into the boundary page table for each of the virtual address spaces; and (c) dynamically allocating the predetermined virtual pages in the system common area within the boundary segment for one of the virtual address spaces to a program so that an available part of the predetermined virtual pages is allocated or deallocated to the program in response to a demand therefrom for allocation or deallocation, while the determined real pages remain fixedly allocated to the predetermined virtual pages.

2. A method according to claim 1 wherein steps (a) and (b) are executed during an initial program loading step.

3. A method according to claim 9, further comprising the step of:

(d) dynamically allocating and deallocating other real pages to virtual pages belonging to the private area within the boundary segment.

4. A method according to claim 3, further comprising the steps of:

(e) in response to allocation of the one virtual page to the program, storing a first storage key as a selected storage key for one real page fixedly allocated to the one virtual page, wherein the first storage key has a value which allows access by the program to the one real page; and (f) in response to deallocation of the one virtual page to the program, storing a second storage key as the selected storage key for the one real page, wherein the second storage key has a value which prohibits access by the program to the one real page.

5. A method according to claim 4, wherein step (c) comprises the steps of:

(i) in response to a demand for allocation issued by a program for virtual pages belonging to the system common area of one of the virtual address spaces, allocating to the program plural available virtual pages belonging to the system common area of the virtual address space;

(ii) detecting whether or not each of the allocated available virtual pages belongs to the boundary segment of the one virtual address space;

(iii) performing steps (e) and (f) for those of the available virtual pages for which the result of the detection step is affirmative.

6. A system for managing storage areas in a computer comprising:

(a) a real storage device having a plurality of real pages;

(b) an address translator for translating virtual addresses corresponding to a plurality of virtual address spaces into real addresses of the real storage device, each of said virtual address spaces being divided into a plurality of segments, each segment comprising a number of virtual pages, each virtual address space including a system common area and a private area, said address translator having a plurality of page tables, for associating the virtual pages of the virtual address spaces to real pages, and a plurality of segment tables, one segment table required for each virtual address space for associating the segments of the virtual address space to page tables provided for the virtual address space;

(c) means for preparing for each virtual address space a page table corresponding to a boundary segment having an area boundary of the system common area and the private area, the boundary page table including first locations, for holding first address transformation information common to the virtual address spaces for associating virtual pages belonging to the system common area within the boundary segment of the virtual address space to real pages commonly allocated to all virtual address spaces, and further including second locations, for holding second address transformation information for the corresponding virtual address space for associating virtual pages belonging to the private area within the boundary segment to real pages privately allocated to that virtual address space;

(d) means for determining real pages common to the virtual address spaces and to be fixedly allocated to predetermined virtual pages belonging to the system common area within the boundary segment of each of the virtual address spaces and being allocatable to a program on demand, before a program issues a virtual page allocation demand for the predetermined virtual pages so as to set appropriate common address transformation information, required for allocation of the determined real pages to the predetermined virtual pages, into the boundary page table for each of the virtual address spaces; and (e) means for dynamically allocating the predetermined virtual pages in the system common area within the boundary segment for one of the virtual address spaces to a program so that an available part of the predetermined virtual pages is allocated or deallocated to the program in response to a demand therefrom for allocation or deallocation, while the determined real pages remain fixedly allocated to the predetermined virtual pages.

7. A system according to claim 6, further comprising:
(f) means for dynamically allocating and deallocating other real pages to virtual pages belonging to the private area within the boundary segment.

8. A system according to claim 7, further comprising:
(g) means, responsive to allocation of the one virtual page to the program, for storing a first storage key as a selected storage key for one real page fixedly allocated to the one virtual page, wherein the first storage key has a value which allows access by the program to the one real page; and
(h) means, responsive to deallocation of the one virtual page to the program, for storing a second storage key as the selected storage key for the one real page, wherein the second storage key has a value which prohibits access by the program to the one real page.

9. A method of managing storage areas in a computer which, in response to virtual addresses designated in programs run on the computer, accesses a real storage device divided into a plurality of real areas, wherein the virtual addresses correspond to a plurality of virtual address spaces, each of said virtual address spaces being divided into a number of virtual areas, each virtual address space including a system common area and a private area, said computer including an address translator for translating virtual addresses into real addresses of the real storage device, said address translator having a plurality of address translation tables, for associating virtual areas of the virtual address spaces to real areas, said method comprising the steps of:

(a) preparing for each virtual address space a boundary address translation table corresponding to a boundary area thereof having an area boundary of the system common area and the private area, the boundary address translation table including first locations, for holding first address transformation information common to the virtual address spaces for associating virtual areas belonging to the system common area within the boundary segment of the virtual address space to real areas commonly allocated to all virtual address spaces, and further including second locations for holding second address transformation information for the corresponding virtual address space for associating virtual areas belonging to the private area within the boundary areas to real areas privately allocated to that virtual address space;

(b) determining real areas common to the virtual address spaces and to be fixedly allocated to predetermined virtual areas belonging to the system common area within the boundary area of each of the virtual address spaces and being allocatable to a program on demand, before a program issues a virtual area allocation demand for the predetermined virtual areas so as to set appropriate address transformation information, required for allocation of the determined real areas to the predetermined virtual areas, into the boundary address translation table for each of the virtual address spaces; and (c) dynamically allocating the predetermined virtual areas in the system common area within the boundary area for one of the virtual address spaces to a program so that an available part of the predetermined virtual areas is allocated or deallocated to the program in response to a demand for allocation or deallocation, while the determined real areas remain fixedly allocated to the predetermined virtual areas.

10. A method according to claim 9, further comprising the step of:
(d) dynamically allocating and deallocating other real areas to virtual areas belonging to the private area within the boundary segment.

11. A method according to claim 10, further comprising the steps of:
(e) in response to allocation of the one virtual area to the program, storing a first storage key as a selected storage key for one real area fixedly allocated to the one virtual area, wherein the first storage key has a value which allows access by the program to the one real area; and
(f) in response to deallocation of the one virtual area to the program, storing a second storage key as the selected storage key for the one real area, wherein the second storage key has a value which prohibits access by the program to the one real area.

12. A method of managing areas in a computer which, in response to virtual addresses designated by programs running on the computer, accesses a real storage device divided into a plurality of real areas, wherein the virtual addresses correspond to a plurality of virtual address spaces, each of said virtual address spaces being divided into a number of virtual areas, each virtual address space including a system common area and a private area, the method comprising the steps of:

determining real areas to be fixedly allocated to predetermined virtual areas belonging to the system common area within the boundary area of each of the virtual address spaces before a program demands allocation of one of the predetermined virtual areas, the virtual areas being allocatable to a program on demand;

in response to a demand for allocation of one of the predetermined virtual areas, allocating one available virtual area of the predetermined virtual areas to the program; and in response to a demand for deallocation of the one virtual area, deallocating the one virtual area from the program.

13. A method according to claim 12, further comprising the steps of:

in response to a demand for allocation of one of the predetermined virtual areas, storing a first storage key as a selected storage key for the one real area fixedly allocated to the one available virtual area, so as to allow the program to access the one real area; and in response to a demand for deallocation of the one virtual area, storing a second storage key as the selected storage key for the one real area, so as to prohibit the program from accessing the one real area, wherein the determined real areas remain fixedly allocated to the predetermined virtual areas after determination thereof and after deallocation of the virtual areas from the programs.

14. A method of managing storage areas in a computer which, in response to virtual addresses designated in programs run on the computer, accesses a real storage device divided into a plurality of real pages, wherein the virtual addresses correspond to a plurality of virtual address spaces, each of said virtual address spaces being divided into a plurality of segments, each segment comprising a number of virtual pages, each virtual address space including a system common area and a private area, said computer including an address translator for translating virtual addresses into real addresses of the real storage device, said address translator having a plurality of pages tables, for associating virtual pages of the virtual address spaces to real pages, and a plurality of segment tables, one segment table required for each virtual address space, for associating the segments of the virtual address space to page tables provided for the virtual address space; said method comprising the steps of:

(a) preparing for each virtual address space a boundary page table corresponding to a boundary segment having an area boundary of the system common area and the private area, the boundary page table including first locations, for holding first address transformation common to the virtual address spaces for associating virtual pages belonging to the system common area within the boundary segment of the virtual address space to real pages commonly allocated to all virtual address spaces, and further including second locations, for holding second address transformation information for the corresponding virtual address space for associating virtual pages belonging to the private area within the boundary segment to real pages privately allocated to that virtual address space;

(b) determining real pages common to the virtual address spaces and to be fixedly allocated to predetermined virtual pages belonging to the system common area within the boundary segments of each of the virtual address spaces and being allocatable to a program on demand, before a program issues a virtual page allocation demand for the predetermined virtual pages so as to set appropriate address transformation information, required for allocation of the determined real pages to the predetermined virtual pages, into the boundary page table for each of the virtual address spaces;

(c) dynamically allocating the predetermined virtual pages in the system common area within the boundary segment for one of the virtual address spaces to a program so that an available part of the predetermined virtual pages is allocated or deallocated to the program in response to a demand therefrom for allocation or deallocation, while the determined real pages remain fixedly allocated to the predetermined virtual pages; and (d) dynamically allocating and deallocating other real pages to virtual pages belonging to a private area within the boundary segment;

(e) in response to allocation of the one virtual page to the program, storing a first storage key for one real page fixedly allocated to the one virtual page, wherein the first storage key has a value which allows access by the program to the one real page; and (f) in response to deallocation of the one virtual page to the program, storing a second storage key for the one real page, wherein the second storage key has a value which prohibits access by the program to the one real page.

15. A method according to claim 14 wherein step (c) comprises the steps of:

(i) in response to a demand for allocation issued by a program for virtual pages belonging to the system common area of one of the virtual address spaces, allocating to the program plural available virtual pages belonging to the system common area of the virtual address space;

(ii) detecting whether or not each of the allocated available virtual pages belongs to the boundary segment of the one virtual address space;

(iii) performing steps (e) and (f) for those of the available virtual pages for which the result of the detection step is affirmative.

16. A system for managing storage areas in a computer comprising:

(a) a real storage device having a plurality of real pages;

(b) an address translator for translating virtual addresses corresponding to a plurality of virtual address spaces into real addresses of the real storage device, each of said virtual address spaces being divided into a plurality of segments, each segment comprising a number of virtual pages, each virtual address space including a system common area and a private area, said address translator having a plurality of page tables, for associating the virtual pages of the virtual address spaces to real pages, and a plurality of segment tables, one segment table required for each virtual address space for associating the segments of the virtual address space to page tables provided for the virtual address space;

(c) means for preparing for each virtual address space a boundary page table corresponding to a boundary segment having an area boundary of the system common area and the private area, the boundary page table including first locations, for holding first address transformation information common to the virtual address spaces for associating virtual pages belonging to the system common area within the boundary segment of the virtual address space to real pages commonly allocated to all virtual address spaces, and further including second locations, for holding second address transformation information for the corresponding virtual address space for associating virtual pages belonging to the private area within the boundary segment to real pages privately allocated to that virtual address space;

(d) means for determining real pages common to the virtual address spaces and to be fixedly allocated to predetermined virtual pages belonging to the system common area within the boundary segment of each of the virtual address spaces and being allocatable to a program on demand, before a program issues a virtual page allocation demand for the predetermined virtual pages so as to set appropriate common address transformation information, required for allocation of the determined real pages to the predetermined virtual pages, into the boundary page table for each of the virtual address spaces;

(e) means for dynamically allocating the predetermined virtual pages in the system common area within the boundary segment for one of the virtual address spaces to a program so that an available part of the predetermined virtual pages is allocated or deallocated to the program in response to a demand therefrom for allocation or deallocation, while the determined real pages remain fixedly allocated to the predetermined virtual pages;

(f) means for dynamically allocating and deallocating other real pages to virtual pages belonging to a private area within the boundary segment;

(g) means, responsive to allocation of the one virtual page to the program, for storing a first storage key for one real page fixedly allocated to the one virtual page, wherein the first storage key has a value which allows access by the program to the one real page; and (h) means, responsive to deallocation of the one virtual page to the program, for storing a second storage key for the one real page, wherein the second storage key has a value which prohibits access by the program to the one real page.

17. A method of managing storage areas in a computer which, in response to virtual addresses designated in programs run on the computer, accesses a real storage device divided into a plurality of real pages, wherein the virtual addresses correspond to a plurality of virtual address spaces, each of said virtual address spaces being divided into a plurality of segments, each segment comprising a number of virtual pages, each virtual address space including a system common area and a private area, said computer including an address translator for translating virtual addresses into real addresses of the real storage device, said address translator having a plurality of page tables, for associating virtual pages of the virtual address spaces to real pages, and a plurality of segment tables, one segment table required for each virtual address space, for associating the segments of the virtual address space to page tables provided for the virtual address space; said method comprising the steps of:

(a) preparing for each virtual address space a boundary page table corresponding to a boundary segment having an area boundary of the system common area and the private area, the boundary page table including first locations, for holding first address transformation information common to the virtual address spaces for associating virtual pages belonging to the system common area within the boundary segment of the virtual address space to real pages commonly allocated to all virtual address spaces, and further including second locations, for holding second address transformation information for the corresponding virtual address space for associating virtual pages belonging to the private area within the boundary segment to real pages privately allocated to that virtual address space;

(b) determining real pages common to the virtual address spaces and to be allocated to predetermined virtual pages belonging to the system common area within the boundary segments of each of the virtual address spaces and being allocatable to a program on demand, before a program issues a virtual page allocation demand for the predetermined virtual pages so as to set appropriate address transformation information, required for allocation of the determined real pages to the predetermined virtual pages, into the boundary page table for each of the virtual address spaces;

(c) dynamically allocating the predetermined virtual pages in the system common area within the boundary segment for one of the virtual address spaces to a program so that an available part of the predetermined virtual pages is allocated or deallocated to the program in response to a demand therefrom for allocation or deallocation, while the determined real pages remain fixedly allocated to the predetermined virtual pages; and (d) dynamically allocating and deallocating other real pages to virtual pages belonging to a private area within the boundary segment, wherein steps (a) and (b) are executed during an initial program loading step.

18. A method of managing storage areas in a computer which, in response to virtual addresses designated in programs run on the computer, accesses a real storage device divided into a plurality of real areas, wherein the virtual addresses correspond to a plurality of virtual address spaces, each of said virtual address spaces being divided into a number of virtual areas, each virtual address space including a system common area and a private area, said computer including an address translator for translating virtual addresses into real addresses of the real storage device, said address translator having a plurality of address translation tables, for associating virtual areas of the virtual address spaces to real areas, said method comprising the steps of:

(a) preparing for each virtual address space a boundary address translation table corresponding to a boundary area thereof having an area boundary of the system common area and the private area, the boundary address translation table including first locations, for holding first address transformation information common to the virtual address spaces for associating virtual areas belonging to the system common area within the boundary segment of the virtual address space to real areas commonly allocated to all virtual address spaces, and further including second locations for holding second address transformation information for the corresponding virtual address space for associating virtual areas belonging to the private area within the boundary area to real areas privately allocated to that virtual address space;

(b) determining real areas common to the virtual address spaces and to be fixedly allocated to predetermined virtual areas belonging to the system common area within the boundary area of each of the virtual address spaces and being allocatable to a program on demand, before a program issues a virtual area allocation demand for the predetermined virtual areas so as to set appropriate address transformation information, required for allocation of the determined real areas to the predetermined virtual areas, into the boundary address translation table for each of the virtual address spaces;

(c) dynamically allocating the predetermined virtual areas in the system common area within the boundary area for one of the virtual address spaces to a program so that an available part of the predetermined virtual areas is allocated or deallocated to the program in response to a demand for allocation or deallocation, while the determined real areas remain fixedly allocated to the predetermined virtual areas;

(d) dynamically allocating and deallocating other first real areas to virtual areas belonging to a private area within the boundary area;

(e) in response to allocation of the one virtual area to the program, storing a first storage key for one real area fixedly allocated to the one virtual area, wherein the first storage key has a value which allows access by the program to the one real area; and (f) in response to deallocation of the one virtual area to the program, storing a second storage key for the one real area, wherein the second storage key has a value which prohibits access by the program to the one real area.

* * * * *